No. 782,456. PATENTED FEB. 14, 1905.
E. LYNDON.
SYSTEM OF ELECTRICAL DISTRIBUTION AND CONTROL.
APPLICATION FILED MAR. 24, 1904. RENEWED JAN. 16, 1905.
4 SHEETS—SHEET 1.
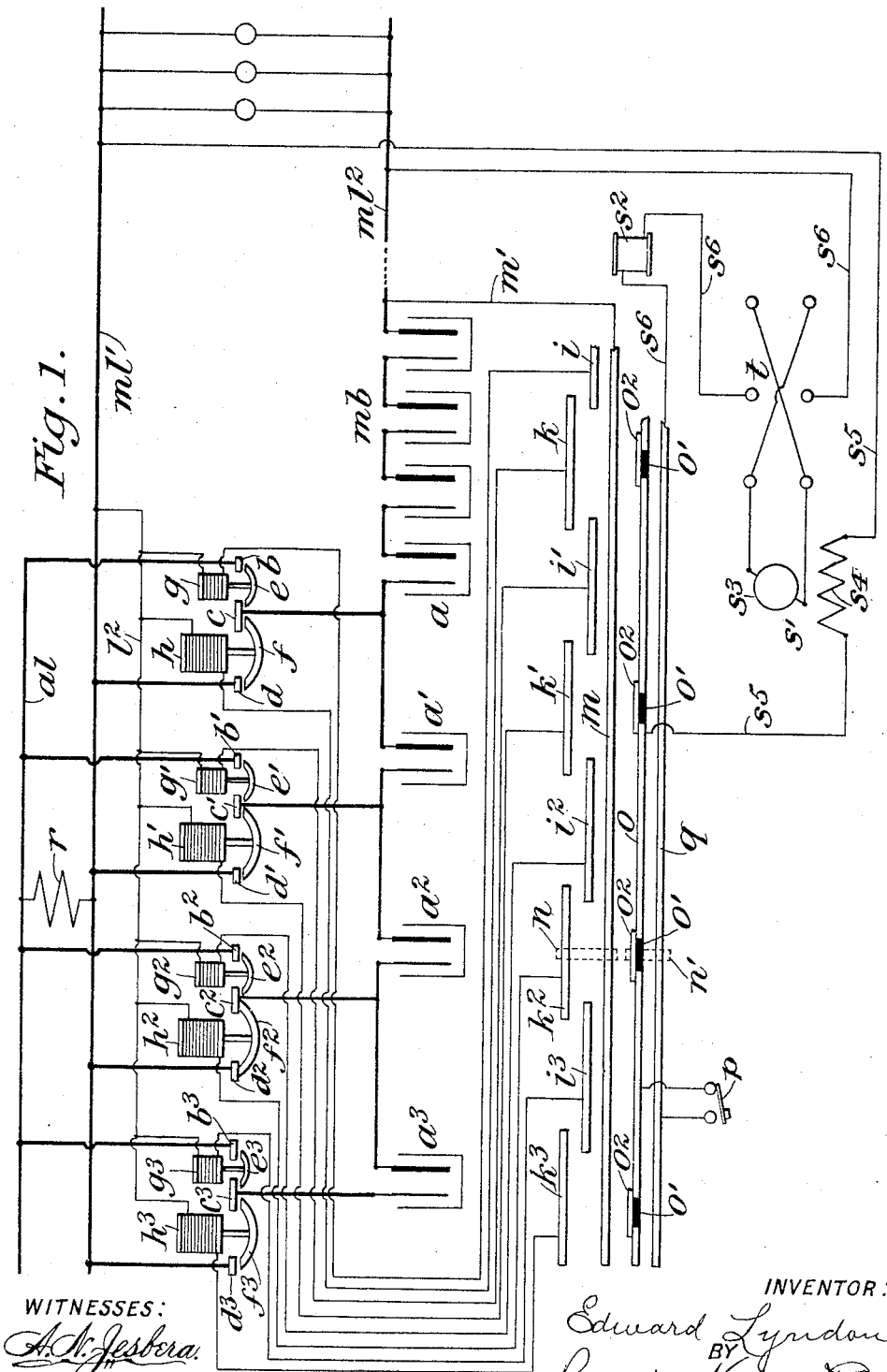
WITNESSES:
A. N. Jesbera.
L. E. Varney.
INVENTOR:
Edward Lyndon
BY
Redding, Kiddle & Greeley
ATTORNEYS.

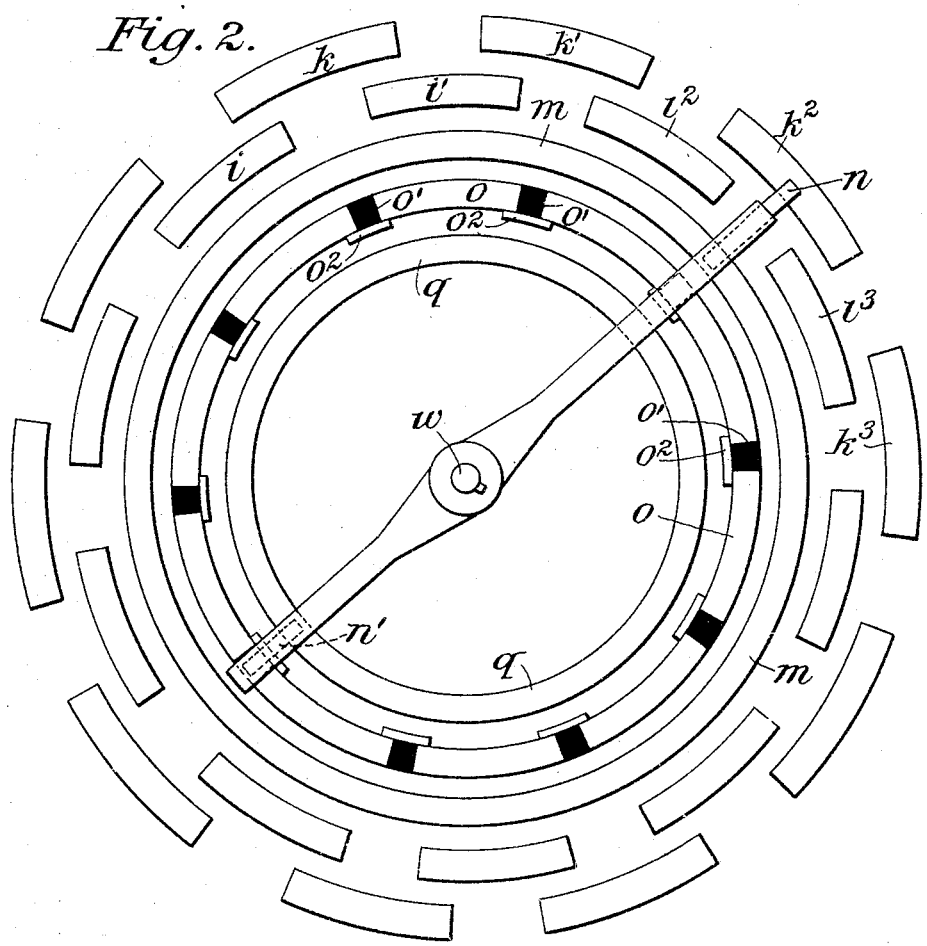

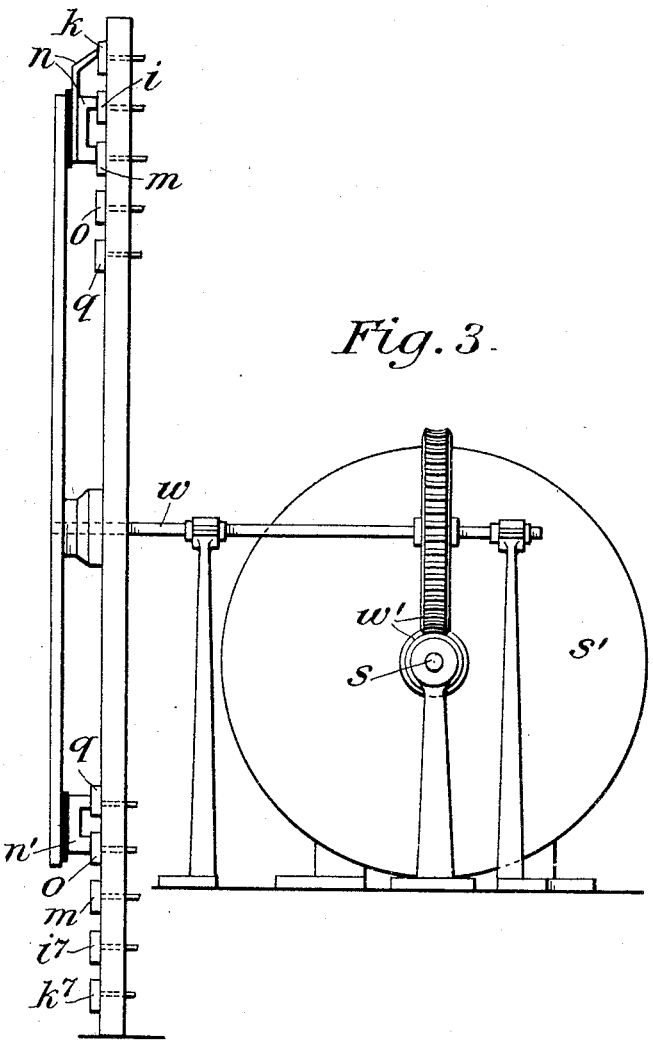

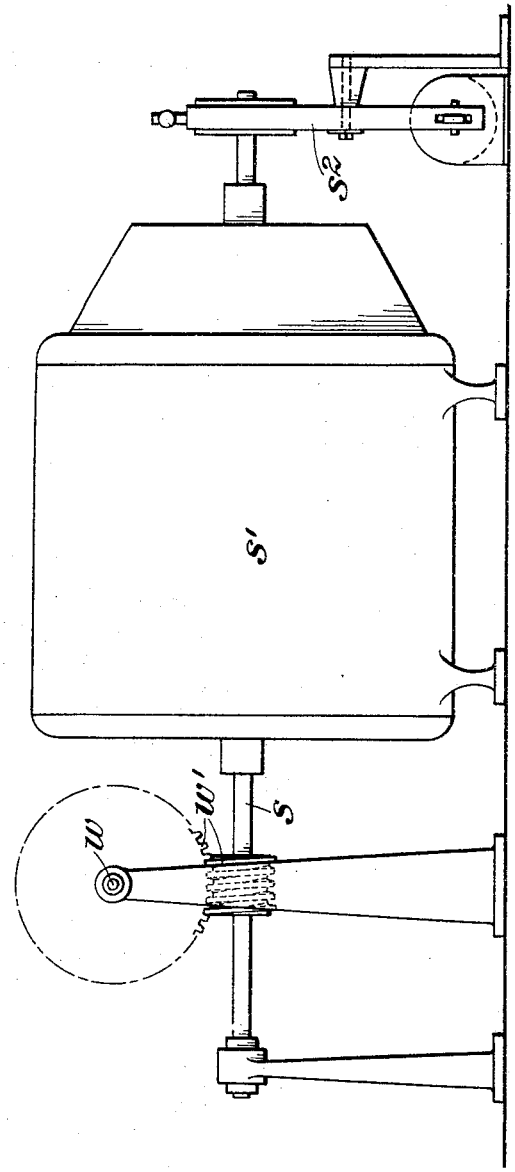

No. 782,456.                                         Patented February 14, 1905.

UNITED STATES PATENT OFFICE.

EDWARD LYNDON, OF NEW YORK, N. Y.

SYSTEM OF ELECTRICAL DISTRIBUTION AND CONTROL.

SPECIFICATION forming part of Letters Patent No. 782,456, dated February 14, 1905.

Application filed March 24, 1904. Renewed January 16, 1905. Serial No. 241,196.

*To all whom it may concern:*

Be it known that I, EDWARD LYNDON, a citizen of the United States, residing in the borough of Manhattan, city of New York, in the State of New York, have invented certain new and useful Improvements in Systems of Electrical Distribution and Control, of which the following is a specification, reference being had to the accompanying drawings, forming a part hereof.

In the operation of large battery plants it is necessary from time to time to vary the number of battery-cells in circuit. This must be accomplished, as is well understood, without interruption of the operating-circuit and without the short-circuiting of any cell. Ordinarily it is sought to attain the desired results by the use of end-cell switches, by means of which one or more of a number of end or reserve cells may be connected in circuit or disconnected from circuit with the main battery. The end-cell switches, however, require each end or reserve cell to be connected to the switch by a conductor heavy enough to carry the maximum current, and in any ordinary installation the cost of such conductors is a large item in the expense, while in a large installation the cost of such conductors is excessive.

It is the object of this invention, accordingly, to provide for varying the number of cells in circuit without the use of what is known as an "end-cell switch" and without the use of a separate conductor from each end or reserve cell to a point external to the battery, while the operating-circuit remains undisturbed and the short-circuiting of any cell is avoided.

It will be obvious as this description proceeds, first, that the elements which enter into the composition of the improved system may be variously arranged, as the construction of the plant to which the device is applied or convenience may render desirable, and, second, that the necessary shifting of contacts to effect a variation in the number of cells in circuit may be accomplished directly by hand or indirectly by hand through suitable switch-motors, which may be operated by any convenient power, or that the operation of the switches or contacts may be controlled by the operation of a single push-button or switch acting through a prime motor by which the switch-motors are controlled. Therefore while the drawings, which have been made a part hereof for the purpose of illustrating and explaining the nature of the invention, show a system which includes electrically-actuated switch-motors and an electric prime motor it will be understood that the invention is applicable to practical use without these devices and that in the general combination other devices may be substituted for those illustrated and described herein.

In the drawings, Figure 1 is a general diagrammatic representation of the improved system, the switch-controlling devices being represented as laid out or developed for the sake of greater clearness in the illustration of the system. Fig. 2 is a diagrammatic face view of the circular controller, the contacts of which are shown developed in Fig. 1. Fig. 3 is a view in outline, representing the controller in edge view and showing also the motor and gearing for driving the same. Fig. 4 is a view in outline, showing the motor for the controller, with the transmitting-gearing and brake for the motor.

Referring first to Fig. 1 of the drawings, the main battery is represented at $mb$ and the end or reserve cells at $a'$, $a^2$, and $a^3$, respectively. The main conductors to the switchboard or distributing circuit are represented at $ml'$ and $ml^2$, respectively. Adjacent to the battery there is also provided an auxiliary conductor $al$, which is connected to the main-line conductor $ml'$ through a resistance $r$ or a source of counter electromotive force which for the purposes of this invention is the full equivalent of an ordinary resistance, the term "resistance" being employed hereinafter with this meaning. In convenient position with relation to the battery, preferably above the bus-bar, there is also provided a series of sets of contact-making devices or switches, one set for the terminal cell $a$ of the main battery and one set for each of the end or reserve cells $a'$ $a^2$, &c. There may also be provided suitable switch-motors for each set of contact-making devices or switches, as indicated in the drawings; but for the purpose of describing the means for adding to or cutting out the circuit one or another of the end or reserve cells it will be sufficient to describe at this point the general arrangement of the contacts or switches and to reserve for the present the explanation of the switch-motors. Each set of contact devices or switches comprises three contacts $b\ c\ d$, $b'\ c'\ d'$, &c., and two movable contacts or switches $e\ f$, $e'\ f'$, &c., arranged, respectively, to complete the circuit between the intermediate contact $c\ c'$, &c., and the contacts $b\ b'$, &c., and $d\ d'$, &c., respectively. Each contact $b\ b'$, &c., is connected to the auxiliary conductor $al$. Each intermediate conductor $c\ c'$, &c., is connected to the bus-bar between the main battery and the successive end or reserve cells, respectively, and each contact $d\ d'$, &c., is connected to the main-line conductor $ml'$. For the sake of clearness and completeness the description of operation of this portion of the invention will now be described before reference is had to any means other than manual for the shifting of the switches or contacts. If it is assumed that both of the end or reserve cells $a'$ and $a^2$ are included in circuit with the main battery, the switch or brush or movable contact $f^2$, as shown in the drawings, completes the circuit from the contact $c^2$, which is connected with the main bus-bar, to the contact $d^2$, which is connected, as described, with the main-line conductor $ml'$. If then it be desired to add the cell $a^3$ to the circuit, the switch device $e^3$ is actuated to connect electrically the contact $b^3$ with the contact $c^3$, thus connecting the cell $a^3$ through such contacts with the auxiliary conductor $al$. Since the auxiliary conductor $al$ is connected to the main-line conductor $ml'$ through the resistance or source of counter electromotive force $r$, the short-circuiting of the cell $a^3$ is prevented. Meanwhile, as will be understood, the connection of the main battery and the two cells $a'$ and $a^2$ with the main line through the contacts $c^2$ and $d^2$ has thus far remained unbroken; but it is now broken by actuating the switch device $f^2$, and while contacts $b^3$ and $c^3$ are still connected electrically the switch device $f^3$ is actuated to connect electrically the contact $c^3$ and the contact $d^3$, thus adding the cell $a^3$ to the operating-circuit without any interruption of the circuit or any short-circuiting of any cell. The switch device $e^3$ may now be actuated or released to open the connection between the contacts $b^3$ and $c^3$. In removing a cell from the operating-circuit the steps just described are followed in the reverse order—that is to say, while the connection between the contacts $c^3$ and $d^3$ still remains closed the connection between the contacts $b^3$ and $c^3$ is closed. Then the connection between the contacts $c^3$ and $d^3$ is opened, next the connection between the contacts $c^2$ and $d^2$ of the cell $a^2$ is closed, and, finally, the connection between the contacts $b^3$ and $c^3$ of the cell $a^3$ is opened. It will be obvious that any of the end or reserve cells may be connected into the circuit or disconnected from the circuit in the same manner, it being understood, of course, that the several end or reserve cells are connected or disconnected in succession, so that the number of cells included in circuit shall be increased or decreased one at a time.

Any suitable motors, such as air or liquid or electrical, may be provided for the actuation of the switch devices from some convenient point external to the battery and more or less remote therefrom. In the drawings such motors are represented as of an electrical type, preferably solenoids, as $g\ h\ g'\ h'$, &c., the cores of which are connected, respectively, with the switch devices $e\ f\ e'\ f'$, &c., the latter being arranged to open by gravity. The windings of all of the solenoids may be connected on one side of the main line $ml'$, as by a suitable conductor $l^2$. On the other side the winding of each of the auxiliary solenoids $g\ g'$, &c., is connected, respectively, with corresponding contacts $i\ i'$, &c., and the windings of the main solenoids $h\ h'$, &c., are likewise respectively connected on the other side with contacts $k\ k'$, &c. A single contact-strip $m$ may be provided for coöperation with the contacts $i\ i'$, &c., $k\ k'$, &c., being connected with the other side of the main line $ml^2$, as by a suitable conductor $m'$. The several contacts $i\ i'$, &c., $k\ k'$, &c., are arranged in parallel relation with the contact-strip $m$ and in a staggered relation with respect to each other, so that the movable contact $n$, which may be arranged to be moved by hand or by any other suitable means along the contact-strip $m$, and the series of contacts $i\ i'$, &c., $k\ k'$, &c., shall connect each solenoid in succession with the main battery, and so provide for the energization of each solenoid in succession and for the actuation of each switch device $e\ f\ e'\ f'$, &c., in succession. As will be observed, the contacts of the two series $i\ i'$, &c., and $k\ k'$, &c., overlap slightly, so that each successive auxiliary solenoid shall be energized and its corresponding switch actuated before the preceding main solenoid $h\ h'$, &c., is deënergized and its switch device released whether the contact $n$ be moved in one direction or in the other. In this manner the connection of each end or reserve cell to the auxiliary conductor $al$ and thence through the resistance $r$ to the main-line conductor $ml'$ is assured before the connection of the preceding end or reserve cell with the main-line conductor $ml^2$ is opened.

While it is obvious that the movable contact or brush $n$ may be moved by hand, as desired, for the addition or subtraction of one or more end or reserve cells, there is illustrated in the drawings and will now be explained a means whereby such contact or brush may be moved through the operation of a suitable motor, which may in turn be controlled by a single switch or push-button. Fig. 1 of the drawings represents such means diagrammatically and with the contact-strips developed, while Figs. 2 and 3 represent, also diagrammatically, such contact-strips, together with those previously referred to, as arranged in circular relation upon a disk with relation to which the contact or brush $n$ may be rotated by a suitable motor controlled as hereinafter explained. Referring particularly to Fig. 2, it will be seen that the contacts $i$ $i'$, &c., $k$ $k'$, &c., and the contact-strip $m$ are arranged concentric and that the movable contact or brush $n$ is mounted to revolve upon the common center. Adjacent to the contact-strip $m$ is a contact-strip $o$, which at intervals on its contact-surface is provided with insulating-blocks $o'$, these being severally arranged in radial position between the successive contacts $i$ $i'$, &c., so that when the movable contact-bar hereinafter referred to rests upon one of such insulating-blocks it shall at the same time complete the circuit between the strip $m$ and one of the blocks $k$ $k'$, &c., only. The contact-strip $o$, it will be understood, is continuous, the insulating-blocks $o'$ being bridged, as indicated at $o^2$, and is connected to one member of the push-button or switch $o$, which is provided for the control of the motor, as hereinafter described. Adjacent to the strip $o$, but insulated therefrom, is another contact-strip $q$, adapted to be connected to the contact-strip $o$ by a movable contact $n'$, which is arranged to move with the contact $n$, but is insulated therefrom, being conveniently carried on the opposite side of the pivot of said arm $n$, as represented in Fig. 2. The two arms or contact bars or brushes $n$ and $n'$ are arranged to move in contact with the several contact-strips, as hereinbefore described, and for convenience may be mounted upon a spindle $w$, which may be driven through a suitable worm-gearing $w'$ from the shaft $s$ of an electric motor $s'$, for which an electrically-actuated brake $s^2$ of ordinary construction may be provided. The contact-strip $o$ may be connected with one side of the main circuit through the field-coils $s^4$ of the motor $s'$, as by a suitable conductor $s^5$, and the contact-strip $q$ may likewise be connected with the other side of the main circuit through the windings of the electric brake $s^2$, a double-pole double-throw switch $t$, and the armature-windings $s^3$ of the motor by a suitable conductor $s^6$, as clearly represented in Fig. 1.

The operation of the contact-brush $n'$ by the motor is as follows: It being assumed that the brush is resting upon one of the insulating-blocks $o'$ and that the circuit is open at the push-button or switch $p$, the motor is at rest and is held by the brake $s^2$. If now the circuit be closed at the push-button or switch $p$, the brake $s^2$ will be released and the motor will begin to rotate and will continue to rotate when the brush $n'$ has passed from the insulating-block $o'$ notwithstanding the fact that the push-button $p$ is released. The rotation of the motor, and consequently the advance of the brush $n'$, will continue until the brush $n'$ reaches the next insulating-block $o'$, when the circuit being open at $e$ the brake $s^2$ will be applied and the motor will be brought to rest with the brush resting on such insulating-block $o'$. The motor will remain at rest with the brush in this position until the circuit is again closed by the operation of the push-button or switch at $p$. It will thus be obvious that the cutting in or cutting out of one of the end or reserve cells will be effected by the operation of the push-button or switch $p$, the direction of movement of the contact-brushes $n$ and $n'$ being determined by the switch $t$.

Although it has been explained herein how the successive addition or subtraction of end or reserve cells may be effected by the manipulation of the switches $p$ and $t$, which may be located at any convenient point either near or remote from the battery, it will be understood that the means whereby such cells are directly connected to or disconnected from the main circuit are independent in construction, arrangement, and operation of the devices whereby the operation of such means is controlled and that so far as concerns such means the invention is not restricted to the coöperation therewith of the controlling devices. Furthermore, it will be obvious that various changes as each particular installation may render desirable may be made not only in the means herein referred to, but in the devices for controlling such means, without departing from the spirit of the invention.

I claim as my invention—

1. A system of electrical distribution and control, comprising a main battery, one or more end or reserve cells, main-line conductors common to the several end or reserve cells, and means whereby each of said end or reserve cells is connected with one of said common main-line conductors successively through a resistance and directly, substantially as described.

2. A system of electrical distribution and control, comprising a main battery, one or more end or reserve cells, main-line conductors common to the several end or reserve cells, means whereby each of said end or reserve cells is connected with one of said common conductors successively through a resistance and directly, and independent devices controlling the operation of said means, substantially as described.

3. A system of electrical distribution and control, comprising a main battery, one or more end or reserve cells, main-line conductors, means whereby each of said end or reserve cells is connected with one of said conductors successively through a resistance and directly, and independent electrically-actuated devices comprising a series of contacts, and a movable contact-brush to control the operation of said means, substantially as described.

4. A system of electrical distribution and control, comprising a main battery, one or more end or reserve cells, main-line conductors, means whereby each of said end or reserve cells is connected with one of said conductors successively through a resistance and directly, and independent electrically-actuated devices comprising a series of contacts, and a movable contact-brush to control the operation of said means, and a motor and intermediate devices to move said contact-brush, substantially as described.

5. A system of electrical distribution and control, comprising a main battery, one or more end or reserve cells, main-line conductors common to the several end or reserve cells, normally open connections between each of the end or reserve cells and one of the common main-line conductors, normally open connections including a permanent resistance between each of said end or reserve cells and said main-line conductor, and means to close or open each of said connections while the other is open or closed, substantially as described.

6. A system of electrical distribution and control, comprising a main battery, one or more end or reserve cells, main-line conductors common to the several end or reserve cells, connections including a main switch between each of the end or reserve cells and one of the common main-line conductors, connections including an auxiliary switch and a permanent resistance between each of said end or reserve cells and said main-line conductor, and means to close or open each of said switches while the other is open or closed, substantially as described.

7. A system of electrical distribution and control, comprising a main battery, one or more end or reserve cells, main-line conductors common to the several end or reserve cells, an auxiliary conductor, a resistance between the auxiliary conductor and one of the common main-line conductors, normally open connections between each of the end or reserve cells and said last-named main-line conductor, normally open connections between each of said end or reserve cells and said auxiliary conductor, and means to close or open each of said connections when the other is open or closed, substantially as described.

8. A system of electrical distribution and control, comprising a main battery, one or more end or reserve cells, main-line conductors, an auxiliary conductor, a resistance between the auxiliary conductor and one of the main-line conductors, a switch device between the main battery and said last-named main-line conductor, connections including a switch between each successive end or reserve cell and said auxiliary conductor and connections including a switch between each of such end cells and said last-named main-line conductor, substantially as described.

9. A system of electrical distribution and control, comprising a main battery, one or more end or reserve cells, main-line conductors, normally open connections including a switch between each of the end or reserve cells and one of the main-line conductors, normally open connections including a switch and a resistance between each of said end or reserve cells and said main-line conductor, independent motors for said switches, and means to control said motors to close or open each of said connections while the other is open or closed, substantially as described.

10. A system of electrical distribution and control, comprising a main battery, one or more end or reserve cells, main-line conductors, normally open connections including an electrically-actuated switch between each of the end or reserve cells and one of the main-line conductors, normally open connections including an electrically-actuated switch and a resistance between each of said end or reserve cells and said main-line conductors, electrical connections to control said switches respectively, and means coöperating with said contacts to actuate said switches in succession, substantially as described.

11. A system of electrical distribution and control, comprising a main battery, one or more end or reserve cells, main-line conductors, an auxiliary conductor, a resistance interposed between said auxiliary conductor and one of said main-line conductors, switch devices and connections to connect each of such end or reserve cells with said auxiliary conductor and with said last-named main-line conductor, electrical connections to control said switches respectively, contacts for said connections respectively, and means coöperating with said contacts to actuate such switch-controlling devices in succession, whereby each end cell may be connected with said last-named main-line conductor and said auxiliary conductor in succession, substantially as described.

12. A system of electrical distribution and control, comprising a main battery, one or more end or reserve cells, main-line conductors, normally open connections including a main switch between each of the end or reserve cells and one of the main-line conductors, normally open connections including a main switch and a resistance between each of said end or reserve cells and said main-line conductor, electrically-actuated devices to control said switches respectively, a series of contacts for said main switches, a series of contacts for said auxiliary switches severally overlapping the first-named contacts and a contact-brush in circuit arranged to complete the circuit with each of said contacts successively, substantially as described.

This specification signed and witnessed this 21st day of March, A. D. 1904.

EDWARD LYNDON.

In presence of—
ANTHONY N. JESBERA,
M. A. BRAYLEY.